United States Patent [19]

Bell et al.

[11] Patent Number: 4,492,824
[45] Date of Patent: Jan. 8, 1985

[54] SPEAKERPHONE LINEAR COMPARATOR

[75] Inventors: Steve W. Bell, Eatontown, N.J.; Milton L. Embree, Reading, Pa.

[73] Assignee: AT&T Bell Laboratories, Murray Hill, N.J.

[21] Appl. No.: 522,106

[22] Filed: Aug. 11, 1983

[51] Int. Cl.³ ............................................. H04M 9/08
[52] U.S. Cl. ............................... 179/81 B; 179/100 L; 307/362; 307/355; 307/356; 330/69; 330/252; 330/288
[58] Field of Search ...................... 307/362, 355, 366; 330/69, 252, 288; 179/100 L, 81 B

[56] References Cited

U.S. PATENT DOCUMENTS

| | | | |
|---|---|---|---|
| 3,171,901 | 3/1965 | Clemency et al. | 179/81 |
| 3,751,602 | 8/1973 | Breeden | 179/81 B |
| 3,889,059 | 6/1975 | Thompson et al. | 179/100 L |
| 3,963,868 | 6/1976 | Randmere et al. | 179/100 L |
| 4,002,854 | 1/1977 | Penrose | 179/81 B |
| 4,317,959 | 3/1982 | Kuriki | 179/81 B |

OTHER PUBLICATIONS

"Fundamental Considerations in the Design of Voice Switched Speakerphone", A. Busala, *Bell System Technical Journal*, Mar. 1960, vol. 39, pp. 265–294.

*Primary Examiner*—Thomas W. Brown
*Assistant Examiner*—James L. Dwyer
*Attorney, Agent, or Firm*—Frederick B. Luludis

[57] ABSTRACT

There is disclosed a precision linear comparator for a speakerphone circuit having two rectifying constant voltage nodes for separately summing two groups of signals derived from a speakerphone transmit channel and receive channel and supplying at an output terminal a signal representative of the difference between two unblocked summed signals. Each node blocks its summed signal if the signal is not representative of a true voice signal. A null signal is supplied at the output terminal during the absence of unblocked summed signals.

17 Claims, 1 Drawing Figure

SPEAKERPHONE LINEAR COMPARATOR

FIELD OF THE INVENTION

This invention relates to the field of linear comparators and more particularly to a linear comparator for a speakerphone circuit.

BACKGROUND OF THE INVENTION

Four-wire speakerphone circuits using voice switch control are arranged to automatically switch to either a transmit mode or to a receive mode based on the level of speech energy present in the respective transmission paths. In prior art circuits, the voice switching decision is made by comparing a Transmit Talk Down (TTD) signal against a Receive Talk Down (RTD) signal. Improvements in speakerphone circuitry led to the inclusion of a Receive Signal Guard (RSG) signal and a Transmit Noise Guard (TNG) signal in the comparison process. These signals account for electro acoustic noise coupled from the loudspeaker to the microphone and background noise received by the microphone and are used to prevent a speakerphone from self-switching. However, the inclusion of these two additional signals in the comparison process degrades the sensitivity of a voice switch circuit.

An unfavorable aspect of degraded voice switch sensitivity is that it allows a loud talker to maintain control of the voice switch and, in turn, the conversation. As such, the opposite party's speech energy must greatly exceed the talker's speech energy to inject a response. This problem has been further aggravated by the inclusion of a Transmit Switch Guard (TSG) signal in the voice switch comparator to account for signals coupled from the transmit path to the receive path via the speakerphone's four-wire to two-wire hybrid circuit.

Thus, to account for guard signals and voice signals prior comparators summed all of these signals together. Consequently, prior linear comparators fail to recognize small differences in transmit and receive voice energy or the presence of large noise guard signals. Therefore, the inclusion of all signals in a one-step comparison process allows noise guard signals to dominate the summing process, which may prevent a speakerphone from switching to a legitimate voice signal. For example, a strong RSG signal may prevent a speakerphone from switching to legitimate receive path voice energy (RTD).

U.S. Pat. No. 3,751,602 issued to R. L. Breeden on Aug. 7, 1973, is an example of loudspeaking telephone circuitry which bases a switching decision on the output of a conventional comparator. As such, the Breeden comparator allows interference between opposing talk down and switch guard signals thereby allowing an undesired signal to reach the comparator output terminals.

U.S. Pat. No. 4,317,959 issued to S. Kuriki on Mar. 3, 1982, is also an example of a speech control circuit which employs a conventional comparator. Further, U.S. Pat. No. 3,963,868 issued to U. Randmere et al. on June 15, 1976, is an example of a loudspeaking telephone system having a partitioned comparator. However, the sensitivity of the Randmere et al comparator is degraded by the addition of blocking diodes connected to the output of the comparator thereby requiring legitimate signals to exceed the diode voltage offset (approximately 0.6 volts) before switching occurs. Moreover, the Randmere et al partitioned comparator is similar to conventional comparators since it is comprised of operational amplifiers. It is well-known to the art that fifteen to thirty transistors are needed to implement an operational amplifier. Consequently, a speakerphone circuit comprised of operational amplifiers is relatively expensive and difficult to implement as an analog integrated circuit chip.

Accordingly, a need exists in the art for a highly sensitive linear comparator which properly determines the presence of legitimate voice signals on speakerphone transmit and receive channels, which has a linear response and which can be readily integratable using no operational amplifiers.

SUMMARY OF THE INVENTION

The stated object and other objects, which are more fully described herein, are achieved by partitioning the comparison process using an inexpensive but precise linear comparator. The linear comparator uses two constant voltage nodes to derive two separate signals representative of legitimate voice signals appearing in the transmit and receive paths of a speakerphone circuit. The legitimate signals, if present, are weighted at an output node and the difference between the signals is used to switch a speakerphone circuit to either a transmit mode or to a receive mode. If a comparison of signals is indicative of non-legitimate voice signals it is blocked at the input to the comparator thereby eliminating the influence that that signal may have on the comparison process.

BRIEF DESCRIPTION OF THE DRAWING

The operation and implementation of the present invention will be more fully apparent and understandable from the following description of the drawing, in which.

DETAILED DESCRIPTION

Figure 1:
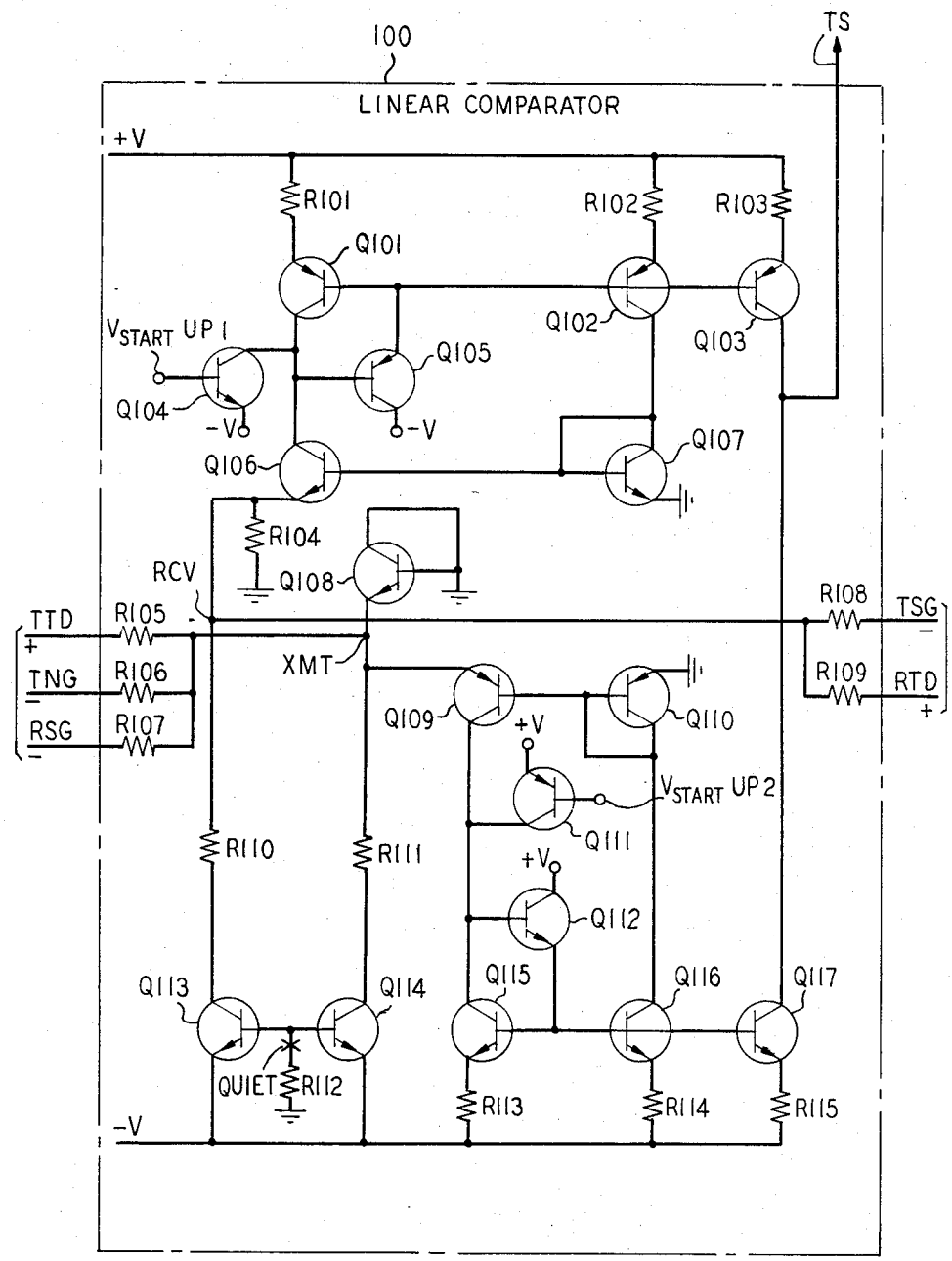
FIG. 1 is a detailed schematic diagram of the linear comparator disclosed herein.

Illustrated in FIG. 1 is a detailed schematic diagram showing one embodiment of our invention. Linear comparator 100 is a precision rectification and summing circuit in which a first group of incoming signals (TTD, TNG and RSG) are independently weighted and summed with the result being rectified and compared against a rectified signal resulting from an independent weighting and summation of a second group of signals (TSG and RTD). Since a major portion of the bottom half of circuit 100 is essentially a mirror image of the top half, a description of the top half is equally applicable to the corresponding portion of the bottom half.

Linear comparator 100 may be readily incorporated in most speakerphone circuits desiring precision voice switching. For example, copending V. E. Munson application of Ser. No. 467,783, filed Feb. 18, 1983, which is hereby incorporated by reference herein, illustrates one speakerphone circuit in which the invention disclosed herein may be practiced.

Resistors R105, R106 and R107 serve to convert a group of voltages on leads TTD, TNG and RSG outputted from a group of peak detectors (not shown but shown in the Munson application), respectively, with the polarity shown, to current signals for summing at node XMT. The polarity of the voltages inputted to circuit 100 is determined by the polarity of the rectifying peak detectors as disclosed in the above-mentioned copending application of Munson. Summation of the currents is made possible since node XMT is held at virtual ground potential by transistor Q109. The currents summed at node XMT then flow into the emitter electrode of transistor Q109.

Diode connected transistor Q110 is a linearity compensating device which varies the base voltage of transistor Q109 in a manner that maintains the emitter electrode of transistor Q109 at virtual ground. The virtual ground occurs because the base electrodes of transistors Q109-Q110 are connected together, because the emitter electrode of transistor Q110 is connected to ground and because transistors Q109 and Q110 are forced to operate at identical current levels thereby making the base to emitter voltages of devices Q109 and Q110 virtually equal. Therefore, the emitter electrode of transistor Q109 is always at or near virtual ground irrespective of the current passed by transistor Q109.

Current is passed by transistor Q109 whenever the summation of currents at node XMT results in a positive current indicating the presence of a legitimate talk down signal (TTD) of sufficient magnitude to offset transmit noise guard (TNG) and receive switch guard (RSG) signals. Conversely, a TTD signal of insufficient magnitude to offset noise and switch guard signals results in a negative current at node XMT causing transistor Q109 to cut off. Diode connected transistor Q108 connecting to node XMT clamps that node to approximately −0.7 volts when transistor Q109 is cut off. In this manner, a peak detector or other circuit connecting to comparator 100 via input terminal TTD, TNG and RSG is not harmed by a negative voltage appearing at node XMT. In a like manner, a transistor clamp could be connected to node RCV to protect circuits supplying voltages via terminals TSG and RTD.

Current flowing through the emitter to collector circuit of transistor Q109 is passed by transistor Q115, which is one branch of the well-known current mirror circuit comprised of transistors Q115, Q116 and Q117 and associated resistors R113, R114 and R115. The current mirror or current source disclosed herein is of the same type disclosed in the well known text *Analysis and Design of Analog Integrated Circuits* by P. R. Gray and R. G. Meyer, published by John Wiley & Sons (1977). Transistor Q117 mirrors the current flowing through transistor Q109 for outputting to a voice switch (not shown) via lead TS. The current flowing through transistor Q109 is also mirrored by transistor Q116 and is then injected into diode connected transistor Q110.

Whenever the current at node XMT becomes negative or tends to flow out of the emitter electrode of transistor Q109, transistor Q109 cuts off sharply and a negligible bias current flows in the circuit comprised of transistors Q109, Q110, Q112, Q115, Q116 and Q117.

Resistors R108 and R109 serve to convert a group of voltages on leads TSG and RTD outputted from a second group of peak detectors, with the polarity shown, to current signals for summing at constant voltage (virtual ground) node RCV. In the same manner as transistor Q110 functions (discussed above) transistor Q107 functions to establish a virtual ground potential at node RCV regardless of the current passing through transistor Q106.

Current is passed through transistor Q106 whenever the polarity of current summed at node RCV is negative. Conversely, when the current at node RCV is positive transistor Q106 cuts off and no current flows through that transistor and associated circuitry.

Current flowing through the emitter to collector junction of transistor Q106 is passed by transistor Q101, which is one branch of a well known current mirror circuit comprised of transistors Q101-Q105 and associated resistors R101-R103. Transistor Q103 mirrors the current flowing through the mirror circuit comprised of transistors Q101-Q105 and changes the polarity of the mirrored current. When transistor Q106 cuts off due to a positive current at node RCV transistor Q103 collector current is negligible.

The current passed by transistor Q103, which is essentially the negative equal of the current passed by transistor Q106 and which is representative of the presence of receive channel voice energy, is opposite in polarity to the current that flows through transistor Q117. Since these two current signals are of opposite polarity, the difference between the two current signals is outputted via lead TS to a voice switch circuit (not shown). Thus, when comparator 100 is used in a speakerphone circuit, voice energy appearing on the speakerphone receive channel causes transistor Q103 to conduct for receiving (sinking) current from a voice switch via lead TS. On the other hand, voice energy appearing on the speakerphone transmit channel causes transistor Q117 to conduct for supplying (sourcing) current to a voice switch via lead TS. Accordingly, the speakerphone voice switch causes the speakerphone circuit to switch to either a transmit mode or to a receive mode depending on whether comparator 100 is supplying or receiving current via lead TS.

When transistors Q109 and Q106 are not conducting small bias currents flow through the collectors to emitter junctions of transistors Q103 and Q117. Since these bias currents are virtually equal but of opposite polarity and cancel, a null signal is provided at the output via lead TS.

Transistors Q104 and Q111 are "start up" devices for injecting currents into their respective current mirror circuits to insure that the circuit converges to a non-zero operating point upon power-up.

Transistors Q113 and Q114 together with resistors R110-R112 provide the well-known quieting function which is under control of the user. Operation of switch QUIET injects a negative current into node XMT via transistor Q114 causing transistor Q109 to cut off and placed in a nonconducting state. An absence of current flowing in transistor Q109 is reflected as an absence of current flowing through transistor Q115, which, in turn, is reflected as an absence of current in transistor Q117. The operation of switch QUIET also injects a negative current into node RCV via transistor Q113 which is passed by transistor Q106 into the current mirror comprised of transistors Q101-Q103 and resistors R101-R103. The net current injected into node TS by transistors Q103 and Q107 is outputted to threshold switch 135 via lead TS. In this manner, a speakerphone switch connected to lead TS is forced into the receive mode during the operation of the QUIET switch.

Resistor R104 connected to node RCV balances the group of two inputs of R108 and R109 with respect to the grouping of three inputs comprised of resistors R105-R107.

CONCLUSION

It is to be understood and apparent that the embodiment of the invention described herein is merely illustrative of the principles of the invention. Various modifications thereto may be effected by persons skilled in the art without departing from the spirit and scope of the invention.

For example, the invention herein may be incorporated in any circuit in which there is a need to compare two groups of signals. Also, the polarity of devices shown herein could be readily changed, i.e., the substitution of NPN type transistors for PNP type transistors, without departing from the scope of the invention claimed herein.

What is claimed is:

1. A linear comparator having a first group and a second group of input terminals, comprising
    a first summing node for summing ones of signals inputted to said first group of terminals,
    means connected to said first node for holding said first node at a constant potential and for accepting a first summed signal of a first polarity and for blocking a first summed signal of a second polarity,
    a second summing node for summing ones of signals inputted to said second group of terminals,
    means connected to said second node for holding said second node at a constant potential and for accepting a second summed signal of said second polarity and for blocking a second summed signal of said first polarity,
    an output node,
    an output terminal, and
    means connected to said output node operative for summing said unblocked signals and for supplying to said output terminal a signal representative of the difference between said unblocked signals and wherein said output node supplying a null signal to said output terminal during the absence of said unblocked signals.

2. The invention set forth in claim 1 wherein said linear comparator further comprises
    switching means operative for injecting a signal of said second polarity into said first and second nodes in order to supply a signal representative of a signal of said second polarity to said output terminal.

3. The invention set forth in claim 1 wherein said constant potential is a virtual ground potential.

4. The invention set forth in claim 1 wherein said first node means includes a first current mirror circuit for replicating said signal of a first polarity at said output node, and said second node means includes a second current mirror circuit for replicating said signal of a second polarity at said output node.

5. The invention set forth in claim 4 wherein said output node is formed by the junction of two branches of said first and second current mirror circuits.

6. A linear comparator having a first and second group of input terminals arranged for converting input voltages connected to said terminals to input currents, comprising
    means connected to said first group of input terminals for summing said first group of input currents,
    means operative for holding said first summing means at a constant voltage and for accepting a first summed current signal of a particular polarity and rejecting a first summed signal of an opposite polarity,
    means connected to said second group of input terminals for summing said second group of input currents,
    means operative for holding said second summing means at a constant voltage and for accepting a second summed current signal of said opposite polarity and rejecting a said second current signal of said particular polarity,
    an output terminal, and
    means responsive to said first and second accepted current signals for supplying to said output terminal a current signal representative of the difference between said first and second accepted current signals and for supplying a null signal to said output terminal during the absence of said first and second accepted current signals.

7. The invention set forth in claim 6 wherein said first summing means is a first common base connected transistor having an emitter electrode connected to said first group of input terminals.

8. The invention set forth in claim 6 wherein said first holding means includes a diode connected transistor having a base electrode connected to a base electrode of said first common base connected transistor and a current mirror circuit, wherein a first branch of said current mirror connected to a collector electrode of said first common base transistor and a second branch of said current mirror circuit connected to a collector electrode of said diode connected transistor for establishing equal currents in said first and second branches of said mirror circuit.

9. The invention set forth in claim 6 wherein said second summing means is a second common base connected transistor having an emitter electrode connected to said second group of input terminals.

10. The invention set forth in claim 6 wherein said second holding means includes a second diode connected transistor having a base electrode connected to a base electrode of said second common base transistor and a second current mirror circuit wherein a first branch of said second current mirror connected to a collector electrode of said second common base transistor and a second branch of said second current mirror connected to a collector electrode of said second diode connected transistor for establishing equal currents in said first and second branches of said second mirror circuit.

11. The invention set forth in claim 6 wherein said difference means includes a third branch of said current mirror circuit joined to a third branch of said second current mirror circuit, and wherein said junction is connected to said output terminal.

12. A linear comparator in a speakerphone circuit having a transmit channel and a receive channel, and wherein said comparator is operative for discerning the legitimacy of voice signals appearing on said transmit and receive channels, comprising
    a first group of input terminals for accepting a transmit talk down signal, a transmit noise guard signal and a receive switch guard signal,
    a second group of input terminals for accepting a receive talk down signal and a transmit switch guard signal,
    means having a constant potential for summing said first group of signals, wherein said first summing means operative for accepting a first summed signal of a first polarity and for rejecting a first summed signal of a second polarity,
    means having said constant potential for summing said second group of signals, and wherein said second summing means operative for accepting a second summed signal of said second polarity and rejecting said second summed signal of said first polarity, means for establishing said constant potential at said first and second summing means irrespective of the magnitude of said first and second accepted signals, an output terminal, and means for replicating said first and second accepted signals and providing at said output terminal a signal representative of the difference between said replicated signals, and wherein said replicating means is operative for supplying a null signal at said output terminal during an absence of said first and second replicated signals.

13. The invention set forth in claim 12 wherein said linear comparator further comprises quieting means for automatically establishing said first rejected signal and said second accepted signal.

14. The invention set forth in claim 12 wherein said constant potential is a virtual ground established by first and second diode connected transistors.

15. The invention set forth in claim 14 wherein said linear comparator further comprises means for establishing a signal passing through said first diode connected transistor equal to said first accepted signal and for establishing a signal passing through said second diode connected transistor equal to said second accepted signal.

16. The invention set forth in claim 15 wherein said signal establishing means is a first current mirror circuit and a second current mirror circuit, respectively.

17. The invention set forth in claim 12 wherein said replicating means includes a common emitter transistor constituting a branch of said first current mirror circuit and a second common emitter transistor constituting a branch of said second current mirror circuit, and wherein the collector electrodes of said first and second common emitter transistor being connected to an output terminal.

* * * * *